United States Patent
Lin et al.

(10) Patent No.: US 10,552,563 B2
(45) Date of Patent: Feb. 4, 2020

(54) DIGITAL DESIGN WITH BUNDLED DATA ASYNCHRONOUS LOGIC AND BODY-BIASING TUNING

(71) Applicant: QUALCOMM Incorporated, San Diego, CA (US)

(72) Inventors: Mark Lin, Encinitas, CA (US); Yu Pu, San Diego, CA (US); Giby Samson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 15/866,876

(22) Filed: Jan. 10, 2018

(65) Prior Publication Data

US 2019/0213296 A1 Jul. 11, 2019

(51) Int. Cl.
*G06F 17/50* (2006.01)
*H03K 19/00* (2006.01)
*H01L 25/00* (2006.01)

(52) U.S. Cl.
CPC ........ *G06F 17/5059* (2013.01); *G06F 17/505* (2013.01); *H03K 19/00* (2013.01);
(Continued)

(58) Field of Classification Search
CPC ............... G06F 17/5059; G06F 17/505; G06F 17/5072; G06F 17/5077; G06F 2217/78; H03K 19/00; H01L 25/00
(Continued)

(56) References Cited

U.S. PATENT DOCUMENTS 4,616,189 A * 10/1986 Pengue, Jr. ......... H03F 3/45376
330/253
6,081,146 A * 6/2000 Shiochi ..................... G06F 1/10
327/149
(Continued)

FOREIGN PATENT DOCUMENTS

JP 2001185963 A * 7/2001 ............. B82Y 10/00
JP 2007243179 A * 9/2007 ......... H01L 27/0921
(Continued)

OTHER PUBLICATIONS

Chen et al., TW 200912598 A, Published Mar. 16, 2009, abstract and 1 drawing. (Year: 2009).*
(Continued)

*Primary Examiner* — Phallaka Kik
(74) *Attorney, Agent, or Firm* — Loza & Loza, LLP/Qualcomm

(57) ABSTRACT

Aspects of the disclosure are directed to a digital design with bundled data asynchronous logic and body-biasing tuning. In one aspect, implementation includes establishing a control path between a first controller and a second controller using a handshaking protocol; establishing a data path between a first latch and a second latch using a bundled data technique; executing a first dynamic body biasing tuning by applying a first body bias signal to the control path; executing a second dynamic body biasing tuning by applying a second body bias signal to the data path. The digital design includes a first controller with a control path to connect to a second controller, wherein a first body bias tuning signal tunes body bias in the control path, a first latch with a data path to connect to a second latch, wherein a second body bias tuning signal tunes body bias in the data path.

30 Claims, 5 Drawing Sheets

(52) U.S. Cl.
CPC ...... *G06F 17/5072* (2013.01); *G06F 17/5077* (2013.01); *G06F 2217/78* (2013.01); *H01L 25/00* (2013.01)

(58) Field of Classification Search
USPC ....... 716/101, 119, 126; 326/33, 41, 101, 93
See application file for complete search history.

(56) References Cited

U.S. PATENT DOCUMENTS

| | | | | |
|---|---|---|---|---|
| 8,816,754 | B1* | 8/2014 | Clark | H03K 17/145 |
| | | | | 327/534 |
| 9,450,402 | B1* | 9/2016 | Huang | H02H 9/041 |
| 2003/0080802 | A1* | 5/2003 | Ono | H03K 19/00384 |
| | | | | 327/534 |
| 2007/0139098 | A1* | 6/2007 | Klass | H03K 19/0027 |
| | | | | 327/534 |
| 2007/0205802 | A1* | 9/2007 | Perisetty | H01L 27/0921 |
| | | | | 326/27 |
| 2007/0205824 | A1* | 9/2007 | Perisetty | H03K 19/0013 |
| | | | | 327/536 |
| 2010/0066438 | A1 | 3/2010 | Siprak et al. | |
| 2011/0026171 | A1* | 2/2011 | Pavlin | H01L 27/0248 |
| | | | | 361/20 |
| 2011/0074498 | A1* | 3/2011 | Thompson | H01L 21/82341 |
| | | | | 327/543 |
| 2011/0133822 | A1* | 6/2011 | Mazure | H01L 21/84 |
| | | | | 327/537 |
| 2012/0070913 | A1* | 3/2012 | Horie | H01L 21/02332 |
| | | | | 438/4 |
| 2012/0126853 | A1 | 5/2012 | Morgenshtein et al. | |
| 2013/0311796 | A1 | 11/2013 | Brinks et al. | |
| 2014/0029146 | A1* | 1/2014 | Pavlin | H01L 27/0248 |
| | | | | 361/84 |
| 2014/0375379 | A1* | 12/2014 | Makiyama | G05F 1/625 |
| | | | | 327/537 |

FOREIGN PATENT DOCUMENTS

| | | | |
|---|---|---|---|
| JP | 2010073728 A | * | 4/2010 |
| WO | 2009132282 A1 | | 10/2009 |
| WO | 2010009142 A1 | | 1/2010 |
| WO | 2010052607 A1 | | 5/2010 |

OTHER PUBLICATIONS

Hensley J., et al., "An Area- and Energy-Efficient Asynchronous Booth Multiplier for Mobile Devices", Proceedings of the IEEE International Conference on Computer Design, Oct. 2004, pp. 1-8.
Kearney D., "Bundled Data Asynchronous Multipliers with Data Dependent Computation Times", Proceedings of the IEEE Third International Symposium on Advanced Research in Asynchronous Circuits and Systems, 1997, pp. 186-197.
International Search Report and Written Opinion—PCT/US2018/064395—ISA/EPO—dated Apr. 9, 2019.

* cited by examiner

DIGITAL DESIGN WITH BUNDLED DATA ASYNCHRONOUS LOGIC AND BODY-BIASING TUNING

TECHNICAL FIELD

This disclosure relates generally to the field of digital designs, and, in particular, to a digital design with bundled data asynchronous logic and body biasing tuning.

BACKGROUND

Digital circuitry generally operates in either of two designs: synchronous or asynchronous. In general, digital circuitry designs must balance circuit performance, (e.g. speed, dc power consumption), particularly for portable applications which use small batteries as the energy supply. One technique used to reduce dc power consumption while maintaining good circuitry performance is the usage of body biasing (BB) also known as back biasing. Typically, body biasing involves the application of a nonzero, but constant, bias voltage to the body or substrate of a transistor in digital circuitry. However, body biasing may be limited in its ability to reduce further the dc power consumption of digital circuitry. Therefore, additional techniques are needed to minimize dc power consumption while maintaining acceptable circuitry performance.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a digital design with bundled data asynchronous logic and body biasing tuning. Accordingly, a method for implementing a digital design with bundled data asynchronous logic and body-biasing tuning, including establishing a control path between a first controller and a second controller using a handshaking protocol; establishing a data path between a first latch and a second latch using a bundled data technique; executing a first dynamic body biasing tuning by applying a first body bias signal to the control path; executing a second dynamic body biasing tuning by applying a second body bias signal to the data path; and transporting a digital signal on the data path between the first latch and the second latch.

In one example, the first controller, the second controller, the first latch and the second latch are components of the digital design. In one example, the digital design is an asynchronous digital design. In one example, the digital design is an ultra-low power (ULP) asynchronous digital design. In one example, the bundled data technique uses one data line for transporting the digital signal.

In one example, the handshaking protocol is a two-phase signaling scheme wherein a request signal and an acknowledgement signal represent one transaction. In one example, the handshaking protocol is a four-phase signaling scheme wherein each of both a request signal and an acknowledgement signal reset by using a return-to-zero (RZ) value after each transition. In one example, the method further includes sending the request signal from the first controller to the second controller, and sending a first enable signal from the first controller to the first latch to enable the first latch to transport the digital signal, and sending a second enable signal from the second controller to the second latch to enable the second latch to receive the digital signal.

In one example, the first dynamic body biasing tuning and the second dynamic body biasing tuning are open-loop tunings. In one example, the first dynamic body biasing tuning and the second dynamic body biasing tuning are closed-loop tunings. In one example, either the first dynamic body biasing tuning or the second dynamic body biasing tuning is executed as a forward body biasing. In one example, either the first dynamic body biasing tuning or the second dynamic body biasing tuning is executed as a reverse body biasing.

Another aspect of the disclosure provides an apparatus for implementing a digital design with bundled data asynchronous logic and body-biasing tuning, including means for establishing a control path between a first controller and a second controller using a handshaking protocol; means for establishing a data path between a first latch and a second latch using a bundled data technique; means for executing a first dynamic body biasing tuning by applying a first body bias signal to the control path; and means for executing a second dynamic body biasing tuning by applying a second body bias signal to the data path.

In one example, the apparatus further includes means for transporting a digital signal on the data path. In one example, the bundled data technique uses one data line for transporting the digital signal. In one example, the handshaking protocol is a two-phase signaling scheme wherein a request signal and an acknowledgement signal represent one transaction. In one example, the handshaking protocol is a four-phase signaling scheme wherein each of both a request signal and an acknowledgement signal reset by using a return-to-zero (RZ) value after each transition.

Another aspect of the disclosure provides an asynchronous digital design including a first controller and a second controller; a control path connecting the first controller and the second controller, wherein a first body bias tuning signal tunes body bias in the control path; a first latch and a second latch; a data path connecting the first latch and the second latch, wherein a second body bias tuning signal, different from the first body bias tuning signal, tunes body bias in the data path.

In one example, the first controller sends a request signal to the second controller, and the second controller sends an acknowledgement signal to the first controller upon receipt of the request signal. In one example, the first controller sends a first enable signal to enable the first latch to send the request signal. In one example, the second controller sends a second enable signal to enable the second latch to receive the request signal and to send the acknowledgement signal. In one example, the asynchronous digital design further includes a combinational logic, wherein the data path connects the first latch and the second latch through one or more components of the combinational logic.

Another aspect of the disclosure provides a computer-readable medium storing computer executable code, operable on a device including at least one processor and at least one memory coupled to the at least one processor, wherein the at least one processor is configured to implement a digital design with bundled data asynchronous logic and body-biasing tuning, the computer executable code including instructions for causing a computer to establish a control path between a first controller and a second controller using a handshaking protocol; instructions for causing the computer to establish a data path between a first latch and a second latch using a bundled data technique; instructions for causing the computer to execute a first dynamic body biasing tuning by applying a first body bias signal to the control path; instructions for causing the computer to execute a second dynamic body biasing tuning by applying a second body bias signal to the data path; and instructions for causing the computer to transport a digital signal on the data path between the first latch and the second latch.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Digital circuitry generally includes two signals paths, a data path and a control path. The data path is used to transport user data signals for an application. The control path is used to carry control signals for configuration control, signal coordination and timing operations. Digital circuitry may utilize a synchronous digital design or an asynchronous digital design. For example, a synchronous digital design uses an auxiliary signal known as a clock. In the synchronous digital design, all digital state transitions (e.g., a transition from a LOW state to a HIGH state, or vice versa) on a data path are made nominally at periodic intervals governed by the clock. That is, the clock may be used to coordinate digital state transitions in the synchronous digital design.

Figure 1:
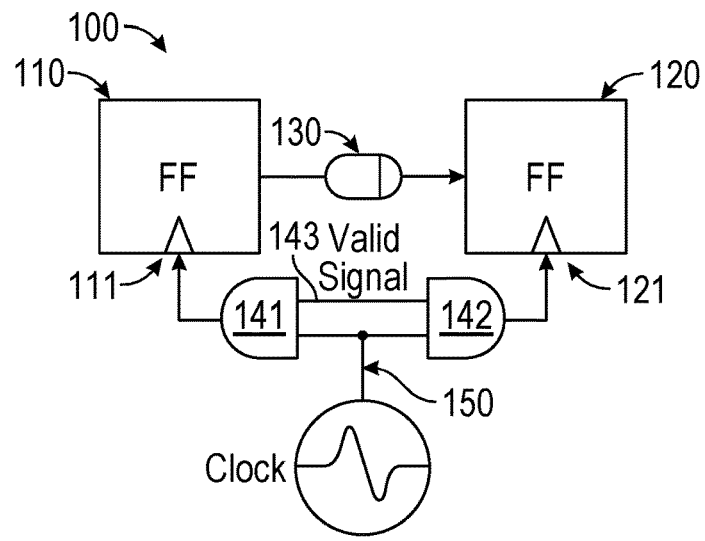
FIG. 1 illustrates an example of a synchronous digital design.

FIG. 1 illustrates an example of a synchronous digital design 100. As shown in FIG. 1, the synchronous digital design 100 includes a source flip flop (FF) 110 with a source enable port 111, a destination flip flop (FF) 120 with a destination enable port 121, and a data path 130 between them. In the example synchronous digital design, a valid signal 143 and a clock signal 150 from the clock may serve as two inputs for a first AND gate 141 and a second AND gate 142. For example, an output of the first AND gate 141 serves as input to the source enable port 111 and an output of the second AND gate 142 serves as input to the destination enable port 121. In one example, a data signal on the data path 130 is transported from the source flip flop 110 to the destination flip flop 120 when the valid signal 143 is asserted HIGH and the clock signal 150 transitions to HIGH. That is, the data signal is transported synchronously with transitions on the clock signal 150 in the synchronous digital design.

In one example, the synchronous digital design may require a local timing constraint for proper operation. For example, the local timing constraint may be expressed as:

$T_{c2q} + T_{comb\_dly} + T_{setup} + T_{margin} < T_{c\_period}$, where $T_{c2q}$=clock-to-output delay with respect to clock edge for the source flip flop
$T_{comb\_dly}$=combinational logic delay
$T_{setup}$=setup time delay
$T_{margin}$=allocated timing margin
$T_{c\_period}$=clock period In one example, the allocated timing margin, $T_{margin}$, is required to accommodate timing uncertainty due to large variability in combinational logic delay and clock skew under marginal conditions (e.g. near threshold computing (NTC) corners). Thus, both performance and dc power consumption may be negatively impacted. For example, the clock period may need to increase with increased combinational logic delay and timing margin to maintain circuit functionality, leading to degraded performance (e.g. circuit speed). In addition, higher drive strength cells and buffers may be required for both logic and clock trees to attain positive timing margin and maintain desired performance which may lead to increased dc power consumption (e.g., dynamic current and leakage current). For example, the clock period may need to be greater than or equal to the sum of logic gate time, flip flop alignment time, clock margin, and process voltage temperature (PVT) margin.

In contrast to a synchronous digital design, an asynchronous digital design does not use a clock. That is, digital state transitions on a data path occur without clock coordination. In one example, the asynchronous digital design may use a handshaking protocol (e.g., on a control path between controllers) to control logical operations (e.g., start, finish, acknowledge, etc.) on the data path.

Figure 2:
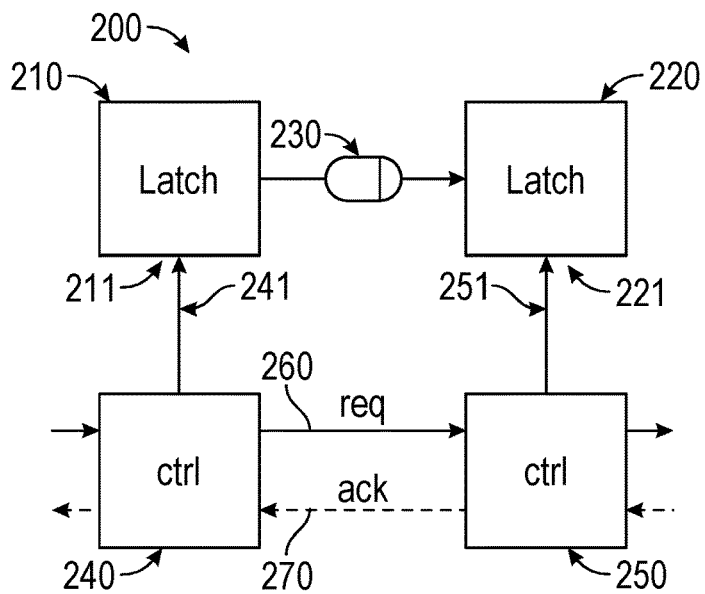
FIG. 2 illustrates an example of an asynchronous digital design.

FIG. 2 illustrates an example of an asynchronous digital design 200. As shown in FIG. 2, the asynchronous digital design 200 includes a source latch 210 with a source enable port 211, a destination latch 220 with a destination enable port 221, and a data path 230 between the source latch 210 and destination latch 220. In one example, a source controller 240 supplies a first enable signal 241 to the source enable port 211 and a destination controller 250 supplies a second enable signal 251 to the destination enable port 221. For example, the operation of the first enable signal 241 and the second enable signal 251 may be governed by a common asynchronous request/acknowledgement handshake protocol. For example, the common asynchronous request/acknowledgement handshake protocol may include a request signal 260 from the source controller 240 to the destination controller 250 and an acknowledgement signal 270 from the destination controller 250 to the source controller 240.

Figure 3:
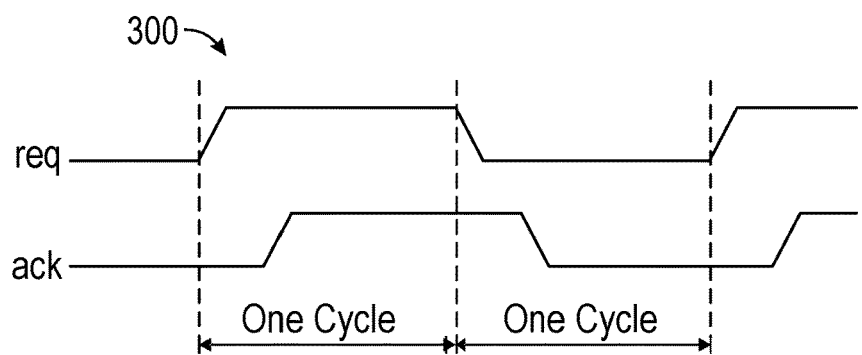
FIG. 3 illustrates an example of a two-phase (transition) signaling scheme.
Figure 4:
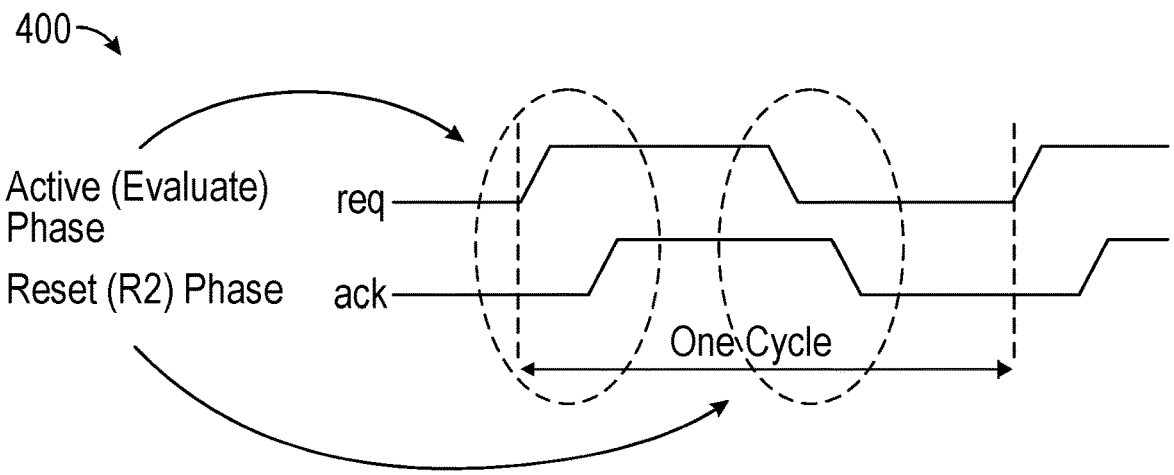
FIG. 4 illustrates an example of a four-phase (level) signaling scheme.

In one example, two types of common asynchronous request/acknowledgement handshake protocol signaling schemes may be used. FIG. 3 illustrates an example 300 of a two-phase (transition) signaling scheme where each request signal and acknowledgement signal represent one transaction. In one example, the request signal is a single transition logic state (e.g., 0 to 1 or 1 to 0). In one example, the acknowledgement signal is a single transition logic state (e.g., 0 to 1 or 1 to 0) FIG. 4 illustrates an example 400 of a four-phase (level) signaling scheme where both the request signal and the acknowledgement signal reset (i.e., return-to-zero "RZ" state). after each transition. As illustrated, an active (evaluate) phase occurs on positive transitions and a reset (return-to-zero "RZ") phase occurs on negative transitions. In one example, adjacent controllers communicate with each other via the request/acknowledge signals. Controllers, at the same time, may also responsible for driving the latch(es). In one example, the source controller drives the source latch, while the destination controller drives the destination latch to allow data propagating from the source latch to the destination latch.

Figure 5:
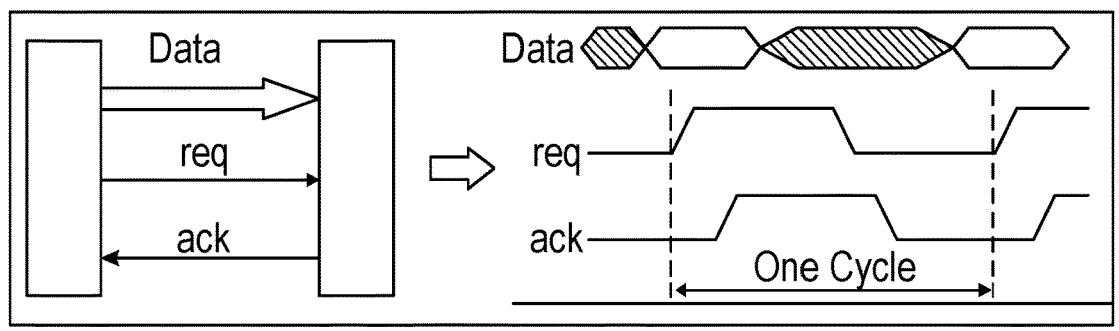
FIG. 5 illustrates an example of a bundled data encoding technique.

In another example, different forms of data encoding technique may be utilized to transport data signals and control signals. FIG. 5 illustrates an example 500 of a bundled data encoding technique. As shown in FIG. 5, in the example 500, there is one data line (labeled as "data") which transports a digital signal. Also, for example, there are two control lines (labeled as "req" and "ack") which carry two control signals: a request signal "req" and an acknowledgement signal "ack".

Figure 6:
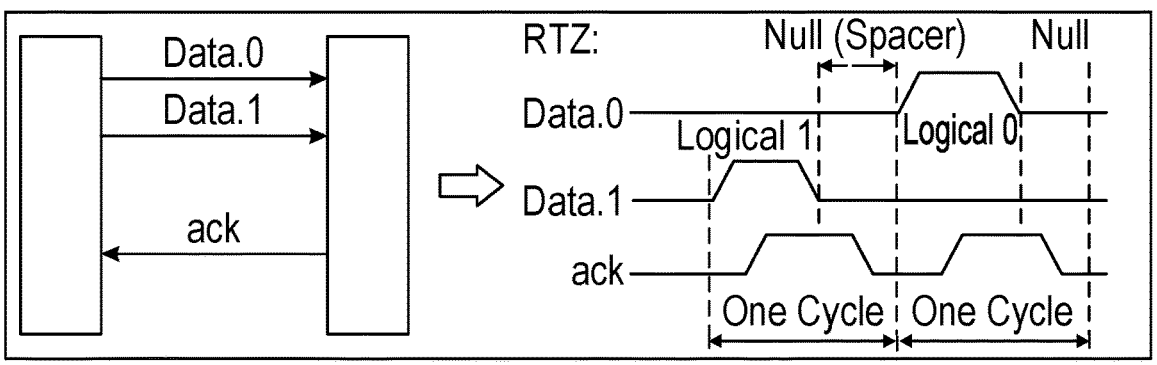
FIG. 6 illustrates an example of a dual-rail data encoding technique.

FIG. 6 illustrates an example 600 of a dual-rail data encoding technique. As shown in FIG. 6, in the example 600, there are two data lines (labeled as "Data.0" and "Data.1") which transports a digital signal with the following encoding:

(0,0) null
(0,1) logic 0
(1,0) logic 1
(1,1) invalid

In one example, a request signal may be encoded into the two data lines (labeled as "Data.0" and "Data.1") and an acknowledgement signal may be carried on a separate control line (labeled as "ack"). In one example, the dual-rail data encoding technique shown in FIG. 6 may have a larger area overhead and a larger power overhead compared to the bundled data encoding technique shown in FIG. 5.

In one example, the bundled data encoding technique (shown in FIG. 5) may require a local timing constraint between the data signal and control signals. For example, the data signal should be stable before the request signal is asserted at a receiving side. In one example, the local timing constraint may be expressed as:

$T_{c2q} + T_{comb\_dly} + T_{setup} + T_{margin} < T_{request}$, where $T_{c2q}$=clock-to-output delay with respect to clock edge for the source flip flop
$T_{comb\_dly}$=combinational logic delay
$T_{setup}$=setup time delay
$T_{margin}$=allocated timing margin
$T_{request}$=delay of request signal In one example, the allocated timing margin, $T_{margin}$, may be reduced due to good delay correlation between control signals (e.g. request signal) and the data signal, since clock uncertainty is removed in the asynchronous digital design, due to the lack of a global clock tree. The asynchronous digital design may also require less dc power consumption due to global clock tree elimination.

In one example, a delay on the request signal may be applied by incorporating a plurality of cascaded delay elements, where in one example, a number of delay elements is proportional to a voltage scaling range and a number of controllers in the bundled data encoding technique. In one example, the number of delay elements is increased with increased combinational logic delay due to tighter (e.g., more aggressive) voltage scaling. In one example, the plurality of cascaded delay elements may result in higher dynamic behavior and greater leakage power. Also, in one example, the bundled data encoding technique may not be adjustable to cover both performance and energy efficiency.

Figure 7:
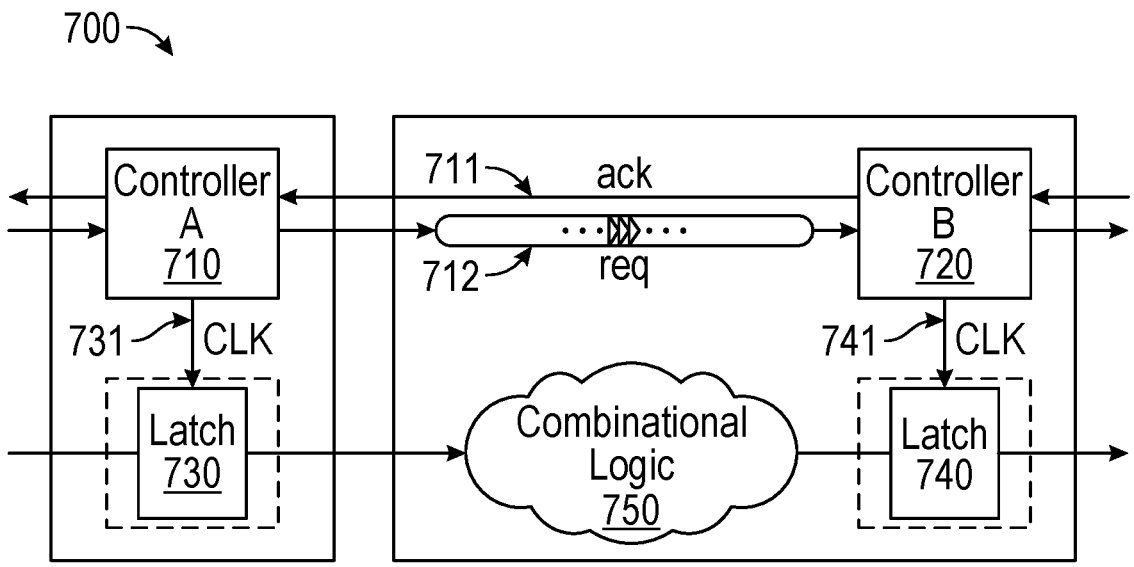
FIG. 7 illustrates an example of an asynchronous digital design using a bundled data encoding technique.

FIG. 7 illustrates an example of an asynchronous digital design 700 using a bundled data encoding technique. As shown in FIG. 7, the asynchronous digital design 700 includes a source controller 710, a destination controller 720, a first latch 730, a second latch 740, an acknowledgement line 711, a request line 712, a source enable signal 731, a destination enable signal 741, and a combinational logic 750. One skilled in the art would understand that in other examples, the asynchronous digital design 700 a) may include other components not listed herein, b) may not include all the components listed herein, or c) may include other components not listed herein in a design with less than all the components listed herein. In one example, the request line 712 includes a plurality of cascaded delay elements to match timing between the request line 712 and the combinational logic 750. In one example, the asynchronous digital design 700 is an ultra-low power asynchronous digital design. In one example, the combinational logic 750 represents a data path.

In one example, asynchronous digital designs may use various techniques for timing resiliency with a bundled data encoding technique. For example, one design may employ a speculative handshaking protocol which uses an average case performance by assuming that errors occur with low probability. For example, reconfigurable delay lines and error detecting latches for timing recovery may be used. The number of delay elements may depend on assumed worst case conditions and error probability. In one example, the use of the speculative handshaking protocol may include an error correction circuitry in the asynchronous digital design to mitigate against errors which may incur circuit overhead.

In one example, asynchronous digital designs may use a quasi-delay-insensitive (QDI) approach. A QDI approach may use, for example, dual rail logic with arbitrary gate/wire delays except for critical isochronic fork timing. In one example, the QDI approach may require a large transistor count to support dual rail logic with high leakage power and/or large implementation area and routing wires.

In one example, the asynchronous digital design minimizes dc power consumption while maintaining circuit performance (e.g., circuit speed, etc.). For example, dc power consumption goals may include attaining a current consumption of less than 10 microamps per MHz of circuit speed and a leakage current of less than 1 microamps.

Figure 8:
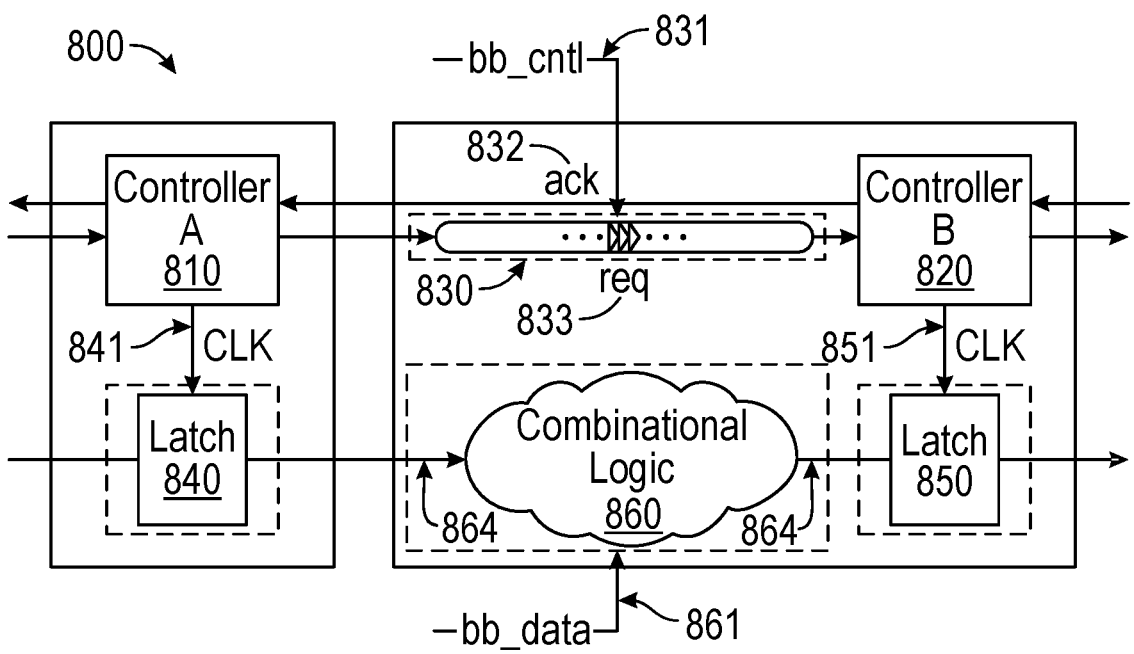
FIG. 8 illustrates an example of an asynchronous digital design with bundled data asynchronous logic and body-biasing tuning.

FIG. 8 illustrates an example of an asynchronous digital design 800 with bundled data asynchronous logic and body-biasing tuning. In one example, the asynchronous digital design 800 is an ultra-low power asynchronous digital design. Shown in FIG. 8, the asynchronous digital design 800 includes a first controller 810 (controller A), a second controller 820 (controller B) and a control path 830 which connects the first controller 810 and the second controller 820. In addition, a first body bias tuning signal bb_cntl 831 tunes body bias in the control path 830. A request signal 833 (labeled as "req") is sent from the first controller 810 to the second controller 820. An acknowledgement signal 832 (labeled as "ack") is sent from the second controller 820 to the first controller 810, for example, upon receipt of the request signal 833. In addition, a first latch 840 receives a first enable signal 841 from the first controller 810 and a second latch 850 receives a second enable signal 851 from the second controller 820.

In one example, the first controller 810 sends the first enable signal 841 to enable the first latch 840 to send the request signal 833. And, the second controller 820 sends the second enable signal 851 to enable the second latch 850 to receive the request signal 833 and to send the acknowledgement signal 832 back to the first controller 810. The first latch 840 and second latch 850 are connected by a data path 864 through a combinational logic 860. In addition, a second body bias tuning signal bb_data 861 tunes body bias in the data path 864. In one example, the second body bias tuning signal bb_data 861 is different from the first body bias tuning signal bb_cntl 831.

One skilled in the art would understand that in other examples, the asynchronous digital design 800 a) may include other components not listed herein, b) may not include all the components listed herein, or c) may include other components not listed herein in a design with less than all the components listed herein.

In one example, the asynchronous digital design 800 may include one or more of the following three design features. For example, a first design feature may be the usage of open-loop or closed-loop body biasing tuning, as opposed to constant body biasing, to adjust circuit performance for either speed enhancement or leakage power reduction (i.e., to adjust circuit performance in terms of time delays and dc power consumption). In one example, forward body biasing lowers a transistor threshold voltage $V_{th}$ which reduces delay (i.e., increases circuit speed). In one example, reverse body biasing raises the transistor threshold voltage $V_{th}$ which increases delay (i.e., decreases circuit speed). By providing separate body biasing tuning to the data path and control path, the timing margin, $T_{margin}$, may be optimally chosen to obtain the fastest circuit speed while still maintaining positive timing margin for circuit conditions. Circuit conditions may include, for example, process variations, voltage variations, temperature variations, etc.

The body biasing tuning may be an open-loop tuning, for example, configurable, operator-selected, etc. Or, the body biasing tuning may be closed-loop tuning, for example, autonomously selected based on sensed real-time circuit conditions. In one example, body biasing may be dynamically applied either as forward body biasing or reverse body biasing for increased performance or for low leakage, depending on the use case. In one example, body biasing may attain low leakage for applications where power collapsing may not be possible (e.g., hearing aid, always-on domain, etc.).

In one example, configurable means variable tuning. That is, a configurable open-loop body biasing tuning may be defined as tuning which may be selected for a particular application, for example, for a particular digital signal to be transported. In one example, an operator selected open-loop body biasing tuning is defined as tuning which is selected by a user or an operator as opposed to a machine. In one example, autonomously selected closed-loop body biasing tuning is defined as tuning which is implemented by a machine, e.g., a computer, a processor, etc.

In one example, dynamic reverse body biasing in asynchronous digital designs allows control signal delay adjustment to maintain timing relationship relative to data signal delay without the addition of more delay elements. Dynamic reverse body biasing may result in lower implementation area, lower dynamic power, and/or lower leakage power.

In one example, dynamic reverse body biasing in asynchronous digital designs accommodates process voltage temperature (PVT) variations and/or post-silicon yield tuning. Dynamic reverse body biasing may be applied to both fully depleted silicon on insulator (FD-SOI) processes and complementary metal oxide semiconductor (CMOS) processes.

In one example, tunable gate delays using dynamic body biasing may reduce the quantity of delay elements needed on the control path to maintain timing relationships. And, both leakage current and dynamic current may be reduced with tunable gate delays using dynamic body biasing. In one example, greater performance and power gain may be achieved using dynamic body biasing with fully depleted silicon on insulator (FD-SOI) technology.

Figure 9:
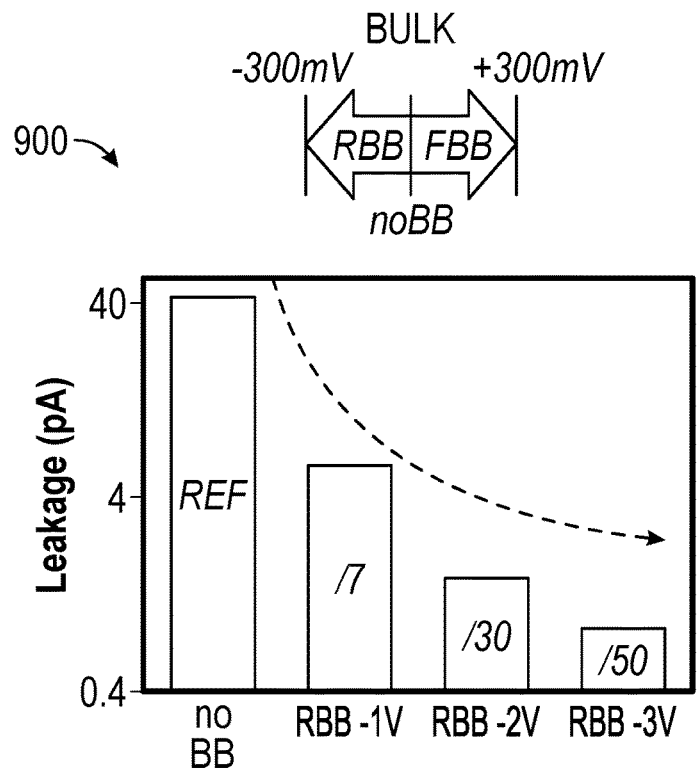
FIG. 9 illustrates an example graph of leakage current versus reverse body biasing (RBB).

FIG. 9 illustrates an example graph 900 of leakage current versus reverse body biasing (RBB). The example graph 900 shows the leakage current, in picoamperes (pA). The example graph 900 shows four reverse body biasing (RBB) cases: 1) no reverse body biasing (no RBB), 2) reverse body biasing (RBB) at −1v, 3) reverse body biasing (RBB) at −2v, and 4) reverse body biasing (RBB) at −3v. In the example graph 900, leakage current decreases with increasing magnitude of reverse body biasing (RBB). Example graph 900 includes a voltage range of −300 mV to +300 mV for BULK. In one example, the voltage range of −300 mV to +300 mV may apply to reverse body biasing (RBB) and/or forward body biasing (FBB) for bulk CMOS. The midpoint (labeled as "no BB") indicates no body biasing (i.e., no reverse body biasing and no forward body biasing).

Figure 10:
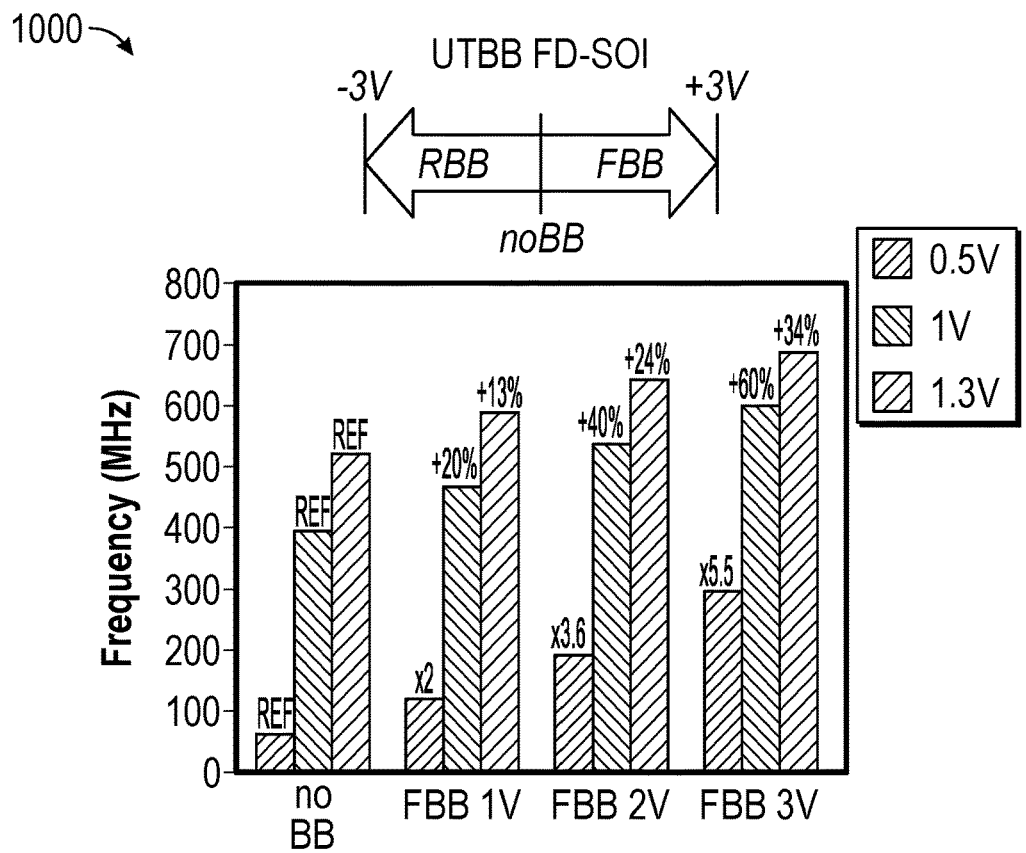
FIG. 10 illustrates an example graph of circuit speed versus forward body biasing (FBB).

FIG. 10 illustrates an example graph 1000 of circuit speed versus forward body biasing (FBB). Circuit speed may also be referred to a clock frequency. As shown in FIG. 10, the circuit speed (labeled as "frequency" in graph 1000) is measured in Megahertz (MHz). The example graph 1000 shows four forward body biasing (FBB) cases: 1) no forward body biasing (no FBB), 2) forward body biasing (FBB) at +1v, 3) forward body biasing (FBB) at +2v, and 4) forward body biasing (FBB) at +3v. In each body biasing case, three example voltage conditions are shown: 0.5v, 1v, and 1.3v.

As shown in graph 1000, circuit speed (labeled as "frequency") increases with increasing forward body biasing (FBB). Thus, as illustrated through FIG. 9 and FIG. 10, dynamic body biasing tuning may allow a tradeoff between leakage current and circuit speed as two design parameters. Example graph 1000 includes a voltage range of −3 V to +3 V for UTBB FD-SOI. In one example, UTBB is a type of fully depleted silicon on insulator (FD-SOI). The midpoint (labeled as "no BB) indicates no body biasing (i.e., no reverse body biasing and no forward body biasing).

For example, a second design feature may be an asynchronous mode design, which does not use a clock for coordination of combinational logic in the data path. Instead, the digital circuitry uses a handshaking protocol for coordination where a sender (e.g., first controller) sends a request signal to a receiver (e.g., a second controller) and the receiver replies with an acknowledgement signal. In this example, the maximum digital circuitry speed is determined not by a clock period, which is typical of synchronous mode designs, but by the minimum request time delay $T_{request}$.

For example, a third design feature is a bundled data technique where the data path and control path delays are tightly controlled or equalized. In this example, there is good correlation in the delay characteristics of the data path and the control path (e.g., good correlation between the request signal and the acknowledgement signal). In one example, the entire data path is carried on a single transmission line (e.g., serial transmission). Consequently, timing margin $T_{margin}$, which contributes to the minimum request time delay $T_{request}$, may be reduced, and the usage of asynchronous mode may result in lower dc power consumption (e.g., elimination of clock circuitry).

In one aspect, with one or more of the three design features, the quantity of circuit component overhead may be reduced. Circuit component overhead may function as delay elements. In one example, applying reverse body voltage increases individual gate delays and therefore reduces the number of delay elements needed to achieve equivalent delay.

Figure 11:
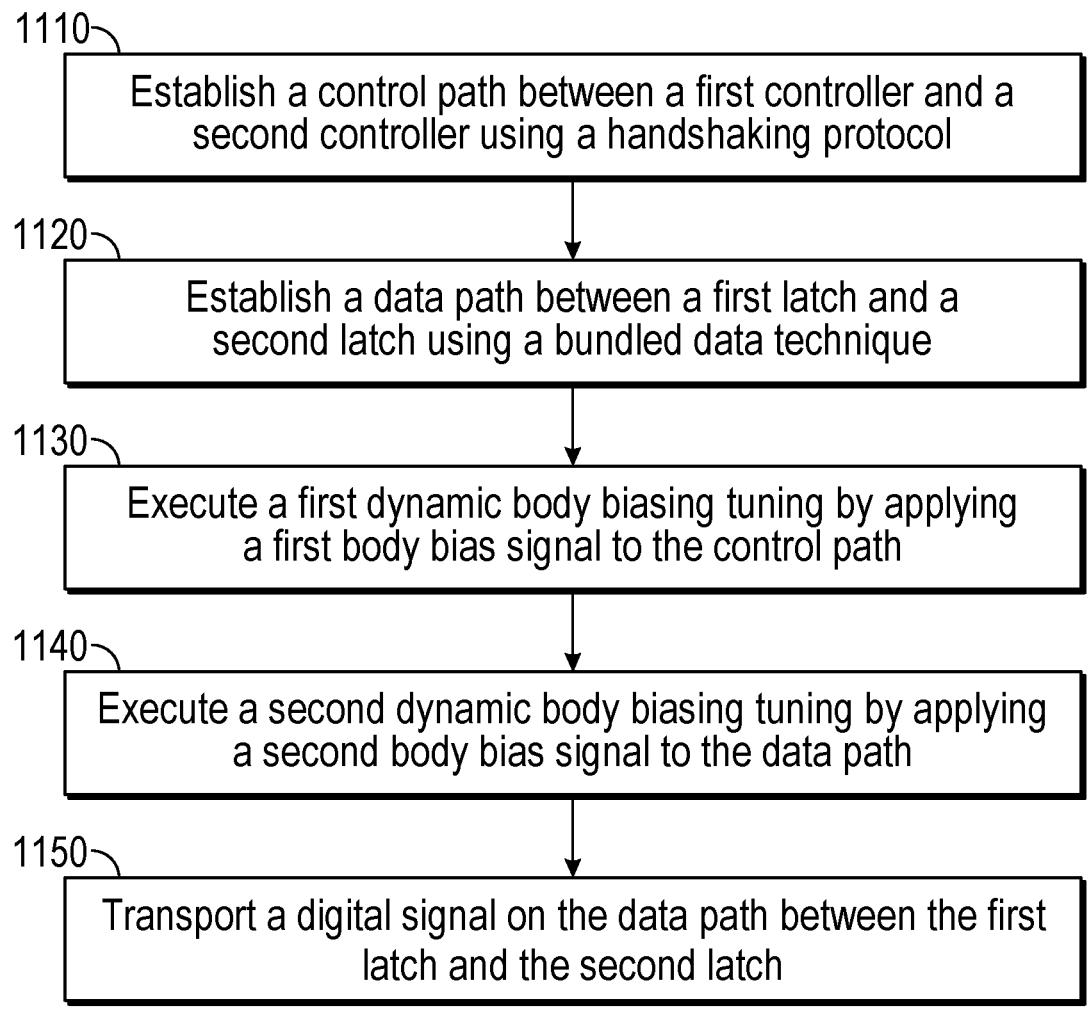
FIG. 11 illustrates an example flow diagram for implementing a digital design with bundled data asynchronous logic and body-biasing tuning.

FIG. 11 illustrates an example flow diagram 1100 for implementing a digital design with bundled data asynchronous logic and body-biasing tuning. In one example, the digital design is an ultra-low power (ULP) digital design. In block 1110, establish a control path between a first controller and a second controller using a handshaking protocol. In one example, the first controller and the second controller are components of the digital design. In one example, the control path includes a request signal and an acknowledgement signal. In one example, the handshaking protocol is a two-phase (transition) signaling scheme where each request signal and acknowledgement signal represent one transaction. In another example, the handshaking protocol is a four-phase (level) signaling scheme where both the request signal and the acknowledgement signal reset (i.e., return-to-zero "RZ") after each transition. In one example, the step of establishing the control path is performed by a processor or a processor coupled to a memory, wherein the processor may be a component of the digital design.

In block 1120, establish a data path between a first latch and a second latch using a bundled data technique. In one example, the first latch and the second latch are components of the digital design. In one example, the first latch is triggered by a first enable signal from the first controller and the second latch is triggered by a second enable signal from the second controller. In one example, the step of establishing the data path is performed by a processor or a processor coupled to a memory, wherein the processor may be a component of the digital design.

In block 1130, execute a first dynamic body biasing tuning by applying a first body bias signal to the control path. In one example, the first body bias (BB) signal is a first forward body bias (FBB) signal. For example, increasing the first FBB signal increases circuit speed of the digital design in the control path. In one example, the first body bias (BB) signal is a first reverse body bias (RBB) signal. For example, increasing the magnitude of the first RBB signal decreases leakage current of the digital design in the control path. In one example, the step of executing the first dynamic body biasing tuning is performed by a processor or a processor coupled to a memory, wherein the processor may be a component of the digital design.

In block 1140, execute a second dynamic body biasing tuning by applying a second body bias signal to the data path. In one example, the second body bias signal is a second forward body bias (FBB) signal. For example, increasing the second FBB signal increases circuit speed of the digital design in the data path. In one example, the second body bias signal is a second reverse body bias (RBB) signal. For example, increasing the magnitude of the second RBB signal decreases leakage current of the digital design in the data path. In one example, the step of executing the second dynamic body biasing tuning is performed by a processor or a processor coupled to a memory, wherein the processor may be a component of the digital design. In one example, the steps in blocks 1110-1140 may be performed using pre-established values from a look-up table.

In block 1150, transport a digital signal on the data path between the first latch and the second latch. In one example, the digital signal is transmitted from the first latch upon receipt of the first enable signal. In one example, the digital signal is received by the second latch upon receipt of the second enable signal. In one example, the transmitting of the digital signal is implemented using the first body bias signal and the second body bias signal to balance circuit speed and leakage current of the digital design. In one example, the step of transporting the digital signal is performed by the first latch, for example, initiated by a first enable signal. In one example, the first enable signal is outputted by a first controller within the digital design. In one example, the step of transporting the digital signal includes the second latch receiving the digital signal. In one example, a second enable signal outputted by a second controller enables the second latch to receive the digital signal. The second controller is a component within the digital design.

In one aspect, one or more of the steps for implementing a digital design with bundled data asynchronous logic and body-biasing tuning in FIG. 11 may be executed by one or more processors which may include hardware, software, firmware, etc. In one aspect, one or more of the steps in FIG. 11 may be executed by one or more processors which may include hardware, software, firmware, etc. The one or more processors, for example, may be used to execute software or firmware needed to perform the steps in the flow diagram of FIG. 11. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in the processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for implementing a digital design with bundled data asynchronous logic and body-biasing tuning. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for implementing a digital design with bundled data asynchronous logic and body-biasing tuning, comprising:
    establishing a control path between a first controller and a second controller using a handshaking protocol;
    establishing a data path between a first latch and a second latch using a bundled data technique;
    executing a first dynamic body biasing tuning by applying a first body bias signal to the control path; and
    executing a second dynamic body biasing tuning by applying a second body bias signal to the data path.

2. The method of claim 1, further comprising transporting a digital signal on the data path between the first latch and the second latch.

3. The method of claim 2, wherein the first controller, the second controller, the first latch and the second latch are components of the digital design.

4. The method of claim 3, wherein the digital design is an ultra-low power (ULP) asynchronous digital design.

5. The method of claim 2, wherein the bundled data technique uses one data line for transporting the digital signal.

6. The method of claim 5, wherein the digital design is an asynchronous digital design.

7. The method of claim 6, wherein the handshaking protocol is a two-phase signaling scheme wherein a request signal and an acknowledgement signal represent one transaction.

8. The method of claim 7, further comprising sending the request signal from the first controller to the second controller.

9. The method of claim 8, further comprising sending a first enable signal from the first controller to the first latch to enable the first latch to transport the digital signal, and sending a second enable signal from the second controller to the second latch to enable the second latch to receive the digital signal.

10. The method of claim 6, wherein the handshaking protocol is a four-phase signaling scheme wherein each of both a request signal and an acknowledgement signal reset by using a return-to-zero (RZ) value after each transition.

11. The method of claim 10, further comprising sending the request signal from the first controller to the second controller.

12. The method of claim 11, further comprising sending a first enable signal from the first controller to the first latch to enable the first latch to transport the digital signal, and sending a second enable signal from the second controller to the second latch to enable the second latch to receive the digital signal.

13. The method of claim 2, wherein the first dynamic body biasing tuning and the second dynamic body biasing tuning are open-loop tunings.

14. The method of claim 13, wherein either the first dynamic body biasing tuning or the second dynamic body biasing tuning is executed as a forward body biasing.

15. The method of claim 13, wherein either the first dynamic body biasing tuning or the second dynamic body biasing tuning is executed as a reverse body biasing.

16. The method of claim 2, wherein the first dynamic body biasing tuning and the second dynamic body biasing tuning are closed-loop tunings.

17. The method of claim 16, wherein either the first dynamic body biasing tuning or the second dynamic body biasing tuning is executed as a forward body biasing.

18. The method of claim 16, wherein either the first dynamic body biasing tuning or the second dynamic body biasing tuning is executed as a reverse body biasing.

19. An apparatus for implementing a digital design with bundled data asynchronous logic and body-biasing tuning, comprising:
means for establishing a control path between a first controller and a second controller using a handshaking protocol;
means for establishing a data path between a first latch and a second latch using a bundled data technique;
means for executing a first dynamic body biasing tuning by applying a first body bias signal to the control path; and
means for executing a second dynamic body biasing tuning by applying a second body bias signal to the data path.

20. The apparatus of claim 19, further comprising means for transporting a digital signal on the data path.

21. The apparatus of claim 20, wherein the bundled data technique uses one data line for transporting the digital signal.

22. The apparatus of claim 20, wherein the handshaking protocol is a two-phase signaling scheme wherein a request signal and an acknowledgement signal represent one transaction.

23. The apparatus of claim 20, wherein the handshaking protocol is a four-phase signaling scheme wherein each of both a request signal and an acknowledgement signal reset by using a return-to-zero (RZ) value after each transition.

24. An asynchronous digital design comprising:
a first controller and a second controller;
a control path connecting the first controller and the second controller, wherein a first body bias tuning signal tunes body bias in the control path;
a first latch and a second latch;
a data path connecting the first latch and the second latch, wherein a second body bias tuning signal, different from the first body bias tuning signal, tunes body bias in the data path.

25. The asynchronous digital design of claim 24, wherein the first controller sends a request signal to the second controller, and the second controller sends an acknowledgement signal to the first controller upon receipt of the request signal.

26. The asynchronous digital design of claim 25, wherein the first controller sends a first enable signal to enable the first latch to send the request signal.

27. The asynchronous digital design of claim 26, wherein the second controller sends a second enable signal to enable the second latch to receive the request signal and to send the acknowledgement signal.

28. The asynchronous digital design of claim 24, further comprising a combinational logic, wherein the data path connects the first latch and the second latch through one or more components of the combinational logic.

29. A non-transitory computer-readable medium storing computer executable code, operable on a device comprising at least one processor and at least one memory coupled to the at least one processor, wherein the at least one processor is configured to implement a digital design with bundled data asynchronous logic and body-biasing tuning, the computer executable code comprising:
instructions for causing a computer to establish a control path between a first controller and a second controller using a handshaking protocol;
instructions for causing the computer to establish a data path between a first latch and a second latch using a bundled data technique;
instructions for causing the computer to execute a first dynamic body biasing tuning by applying a first body bias signal to the control path; and
instructions for causing the computer to execute a second dynamic body biasing tuning by applying a second body bias signal to the data path.

30. The non-transitory computer-readable medium of claim 29, further comprising instructions for causing the computer to transport a digital signal on the data path between the first latch and the second latch.

* * * * *